(12) United States Patent
McCullough et al.

(10) Patent No.: US 9,550,578 B2
(45) Date of Patent: Jan. 24, 2017

(54) SYSTEMS AND METHODS FOR UTILIZING VOICE COMMANDS ONBOARD AN AIRCRAFT

(71) Applicant: HONEYWELL INTERNATIONAL INC., Morristown, NJ (US)

(72) Inventors: Sue McCullough, Phoenix, AZ (US); Mahesh Sivaratri, Karnataka (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 134 days.

(21) Appl. No.: 14/171,847

(22) Filed: Feb. 4, 2014

(65) Prior Publication Data

US 2015/0217870 A1 Aug. 6, 2015

(51) Int. Cl.
| | |
|---|---|
| *G10L 21/00* | (2013.01) |
| *B64D 43/00* | (2006.01) |
| *B64D 31/04* | (2006.01) |
| *G06F 3/16* | (2006.01) |
| *G10L 15/08* | (2006.01) |
| *G10L 15/00* | (2013.01) |
| *G08G 5/00* | (2006.01) |
| *G10L 15/22* | (2006.01) |

(52) U.S. Cl.
CPC ............. *B64D 43/00* (2013.01); *B64D 31/04* (2013.01); *G06F 3/167* (2013.01); *G08G 5/0021* (2013.01); *G10L 15/22* (2013.01); *G08G 5/003* (2013.01); *G10L 15/00* (2013.01); *G10L 15/08* (2013.01); *G10L 2015/085* (2013.01); *G10L 2015/223* (2013.01); *G10L 2015/228* (2013.01)

(58) Field of Classification Search
CPC combination set(s) only.
See application file for complete search history.

(56) References Cited

U.S. PATENT DOCUMENTS

| | | |
|---|---|---|
| 4,725,956 A | 2/1988 | Jenkins |
| 5,844,503 A | 12/1998 | Riley et al. |
| 6,128,594 A | 10/2000 | Gulli et al. |
| 6,182,039 B1 | 1/2001 | Rigazio et al. |
| 6,236,913 B1 * | 5/2001 | Bomans ................. G01C 23/00 244/221 |

(Continued)

FOREIGN PATENT DOCUMENTS

EP    2337024 A1    6/2011

OTHER PUBLICATIONS

Extended EP search report for EP 15152017.8-1910 dated Jun. 12, 2015.

(Continued)

*Primary Examiner* — Richard Zhu
(74) *Attorney, Agent, or Firm* — Lorenz & Kopf, LLP

(57) ABSTRACT

A system and method are provided for programming a flight management system in response to a voice input. The voice input is validated (the pilot spoken vocabulary is thereby filtered (e.g., adapted) to improve recognition accuracy and reduce false positives) by comparing the current operational state of the aircraft (for example, climb, level flight, descent, speed, altitude, and heading), operation validities and availabilities (for example, operations allowed and not allowed) based on the flight management system planned and predicted lateral and vertical trajectory of the flight route (flight plan) from origin/present position to destination, and the requested action being taken.

20 Claims, 8 Drawing Sheets

| A | B | C | D |
|---|---|---|---|
| Filtered Cockpit Vocabulary | Aircraft scenario | Operation Availability Values | Filtered Cockpit Vocabulary |
| A: 1. ACTIVATE MISSED APPROACH<br>2. DESCENT NOW<br>3. RESUME HOLD<br>4. EXIT HOLD<br>5. UNDO DIRECT TO<br>6. FLY VECTORS TO APPROACH<br>7. HOLD AT PPOS INBOUND TRACK [direction] | "FLY VECTORS TO APPROACH" is valid command if and only if<br>1. Vectors approach is defined<br>2. FAF is not yet sequenced<br>3. Aircraft is within 30NM of destination airport.<br><br>Assume Aircraft has already sequenced FAF or outside of 30NM radius of destination airport. | Resume Hold Pattern is allowed: FALSE<br>Exit Hold Pattern is allowed: FALSE<br>Hold Pattern At PPOS is allowed: TRUE<br>Pending Plan activation allowed: FALSE<br>Undo Direct To is allowed: FALSE<br>Vectors Activation to Final Approach Fix is allowed: FALSE<br>Early Descent is allowed: FALSE<br>Missed Approach Activation is allowed: FALSE | 1. ACTIVATE MISSED APPROACH<br>2. DESCENT NOW<br>3. RESUME HOLD<br>4. EXIT HOLD<br>5. UNDO DIRECT TO<br>6. FLY VECTORS TO APPROACH<br>7. HOLD AT PPOS INBOUND TRACK [direction] |
| B: 1. ACTIVATE MISSED APPROACH<br>2. DESCENT NOW<br>3. RESUME HOLD<br>4. EXIT HOLD<br>5. UNDO DIRECT TO<br>6. FLY VECTORS TO APPROACH<br>7. HOLD AT PPOS INBOUND TRACK [direction] | Assume Aircraft is within 30 NM from destination airport and vectors approach is defined | Resume Hold Pattern is allowed: FALSE<br>Exit Hold Pattern is allowed: FALSE<br>Hold Pattern At PPOS is allowed: TRUE<br>Pending Plan activation allowed: FALSE<br>Undo Direct To is allowed: FALSE<br>Vectors Activation to Final Approach Fix is allowed: TRUE<br>Early Descent is allowed: FALSE<br>Missed Approach Activation is allowed: FALSE | 1. ACTIVATE MISSED APPROACH<br>2. DESCENT NOW<br>3. RESUME HOLD<br>4. EXIT HOLD<br>5. UNDO DIRECT TO<br>6. FLY VECTORS TO APPROACH<br>7. HOLD AT PPOS INBOUND TRACK [direction] |

(56) References Cited

U.S. PATENT DOCUMENTS

| | | | |
|---|---|---|---|
| 6,346,892 B1* | 2/2002 | DeMers | G05B 19/106 |
| | | | 340/945 |
| 6,360,203 B1 | 3/2002 | Prince | |
| 6,691,004 B2* | 2/2004 | Johnson et al. | 701/14 |
| 6,697,716 B2 | 2/2004 | Horst | |
| 6,859,773 B2 | 2/2005 | Breton | |
| 6,889,189 B2 | 5/2005 | Boman et al. | |
| 6,985,852 B2 | 1/2006 | Wang | |
| 7,089,108 B2 | 8/2006 | Merritt | |
| 7,174,300 B2* | 2/2007 | Bush | 704/275 |
| 7,289,890 B2 | 10/2007 | Mitchell et al. | |
| 7,415,326 B2 | 8/2008 | Komer et al. | |
| 7,469,211 B2 | 12/2008 | Takami et al. | |
| 7,496,511 B2 | 2/2009 | Vora | |
| 7,555,431 B2 | 6/2009 | Bennett | |
| 7,580,377 B2 | 8/2009 | Judd | |
| 7,606,715 B1 | 10/2009 | Krenz | |
| 7,672,850 B2 | 3/2010 | Kaatrasalo | |
| 8,195,347 B2 | 6/2012 | Boorman | |
| 8,224,653 B2 | 7/2012 | De Mers et al. | |
| 8,515,763 B2 | 8/2013 | Dong et al. | |
| 8,666,748 B2* | 3/2014 | Dong | G08G 5/0013 |
| | | | 704/270 |
| 9,132,913 B1* | 9/2015 | Shapiro | B64C 19/00 |
| 9,190,073 B2 | 11/2015 | Dong et al. | |
| 2002/0087319 A1 | 7/2002 | Stephenson | |
| 2002/0107694 A1 | 8/2002 | Lerg | |
| 2003/0025682 A1 | 2/2003 | Dame | |
| 2003/0222887 A1* | 12/2003 | Wilkins, Jr. | G01C 23/005 |
| | | | 345/618 |
| 2004/0030560 A1* | 2/2004 | Takami et al. | 704/275 |
| 2004/0124998 A1 | 7/2004 | Dame | |
| 2004/0138882 A1* | 7/2004 | Miyazawa | 704/233 |
| 2005/0114140 A1 | 5/2005 | Brackett et al. | |
| 2005/0203700 A1* | 9/2005 | Merritt | 701/206 |
| 2005/0228674 A1 | 10/2005 | Gunn et al. | |
| 2007/0288128 A1 | 12/2007 | Komer et al. | |
| 2008/0183343 A1* | 7/2008 | Brent et al. | 701/3 |
| 2008/0201148 A1* | 8/2008 | Desrochers | 704/257 |
| 2011/0125503 A1* | 5/2011 | Dong et al. | 704/275 |
| 2013/0158991 A1 | 6/2013 | Dong et al. | |
| 2014/0343765 A1* | 11/2014 | Suiter | G08G 5/0056 |
| | | | 701/18 |

OTHER PUBLICATIONS

Tomasz Rogalski, et al.; A Concept of Voice Guided General Aviation Aircraft, Aerospace Science and Technology 14 (2010) 321-328; 2010 Elsevier Masson SAS.
EP Search Report, EP 10187078.0-2225 dated Mar. 15, 2011.
EP Communication, EP 10187078.0-2225 dated Jul. 17, 2012.
EP Summons to Oral Proceedings for Application No. EP 10187078.0 dated Feb. 17, 2015.
EP Examination Report for Application No. 15152017.8-1910 dated May 20, 2016.

* cited by examiner

| Operation Validity | Conditions |
|---|---|
| Exit Hold | Aircraft is Holding<br>OR<br>Aircraft is in Deceleration zone to HOLD |
| Resume Hold | Aircraft is Exiting the hold |
| Manual Missed Approach Activation | 1. Missed approach exist, and<br>2. Aircraft Along Track Dist to Final Approach Fix is 2NM or Runway is within 5 NM |
| Early Descent | 1. Aircraft is in Cruise,<br>2. Aircraft is within Early Descent Dist to destination,<br>3. Active Auto Pilot vertical mode is set,<br>4. LNAV is engaged, and<br>5. Aircraft is not flying holding pattern, if flying it is commanded for exiting the hold |
| Divert to waypoint | Allowed in all cases except:<br>1. Divert TO waypoint is intercept/altitude/radial/distanace/manual termination waypoints<br>2. Divert TO waypoint is missed approach origin<br>3. Aircraft is actively flying in oribit or holding pattern<br>4. Aircraft is flying ARC turn<br>5. Divert TO operation breaks leg patterns and transitions |
| Vector Approach Intercept Activation To Fix | Allowed only on final approach fix |
| Altitude Constraint Revision | Allowed on<br>1. Waypoint is within the Origin Proximity distance and In climb or less, or<br>2. Waypoint is in Departure procedure and In climb or less, or<br>3. Waypoint is within the Destination Proximity distance, or<br>4. Waypoint is in Arrival procedure |
| | Not allowed on<br>1. On IF of Vector intercept,<br>2. On waypoint Beyond MAP, and<br>2. On waypoints in circling approaches |
| Vertical Direct TO Altitude | Allowed to:<br>1. Waypoint that has altitude constraint |
| | Not allowed on:<br>1. Altitude terminated legs as they are not altitude constraints, they are leg terminations<br>2. On IF leg of vector intercept<br>3. Beyond missed approach point<br>3. Climb constraint that is BELOW the aircraft altitude<br>4. Descent constraint that is ABOVE theaircraft altitude<br>5. The constraint is a climb constraint and the clearance altitude is not more than 150 feet above the aircraft altitude<br>6. The constraint is a descent constraint that is below the aircraft altitude and the clearance altitude is greater than the aircraft altitude minus 150 feet |

FIG. 2

| A | B | C | D |
|---|---|---|---|
| Cockpit Vocabulary | Aircraft scenario | Operation Availability Values | Filtered Cockpit Vocabulary |
| 1. ACTIVATE MISSED APPROACH | Aircraft is flying a track to fix leg (TF leg) and outside of any planned holding pattern vicinity. Also assume that FMS predictions on XYZ waypoint are as: 1. Direct TO allowed 2. Hold entry allowed 3. Altitude constraints insertion NOT allowed 4. Steps insertion is allowed 5. Time Constraint is allowed | Resume Hold Pattern is allowed: FALSE | 1. ACTIVATE MISSED APPROACH |
| 2. DESCENT NOW | | Exit Hold Pattern is allowed: FALSE | 2. DESCENT NOW |
| 3. RESUME HOLD | | Hold Pattern At PPOS is allowed: TRUE | 3. RESUME HOLD |
| 4. EXIT HOLD | | Pending Plan activation allowed: FALSE | 4. EXIT HOLD |
| 5. UNDO DIRECT TO | | Undo Direct To is allowed: FALSE | 5. UNDO DIRECT TO |
| 6. FLY VECTORS TO APPROACH | | Vectors Activation to Final Approach Fix is allowed: FALSE | 6. FLY VECTORS TO APPROACH |
| 7. HOLD AT [position] MAINTAIN [altitude] INBOUND TRACK [direction] | | Early Descent is allowed: FALSE | 7. HOLD AT [position] MAINTAIN [altitude] INBOUND TRACK [direction] |
| 8. HOLD AT PPOS INBOUND TRACK [direction] | | Missed Approach Activation is allowed: FALSE | 8. HOLD AT PPOS INBOUND TRACK [direction] |
| 9. AT [position] CLIMB TO [altitude] | | Waypoint Operation Availability on XYZ waypoint | 9. AT [position] CLIMB TO [altitude] |
| 10. AT [position] CRUISE CLIMB TO [altitude] | | Waypoint addition allowed: TRUE | 10. AT [position] CRUISE CLIMB TO [altitude] |
| 11. AT [position] DESCENT TO [altitude] | | Direct to is allowed: TRUE | 11. AT [position] DESCENT TO [altitude] |
| 12. AT [position] CRUISE DESCENT TO [altitude] | | HOLD Entry is allowed: TRUE | 12. AT [position] CRUISE DESCENT TO [altitude] |
| | | Altitude Constraint Entry allowed: FALSE | |
| | | Time Constraint Entry allowed: TRUE | |
| | | Step Altitude Entry Allowed: TRUE | |

FIG. 3A

| A | B | C | D |
|---|---|---|---|
| 1. ACTIVATE MISSED APPROACH<br>2. DESCENT NOW<br>3. RESUME HOLD<br>4. EXIT HOLD<br>5. UNDO DIRECT TO<br>6. FLY VECTORS TO APPROACH<br>7. HOLD AT [position] MAINTAIN [altitude] INBOUND TRACK [direction]<br>8. HOLD AT PPOS INBOUND TRACK [direction]<br>9. AT [position] CLIMB TO [altitude]<br>10. AT [position] CRUISE CLIMB TO [altitude]<br>11. AT [position] DESCENT TO [altitude]<br>12. AT [position] CRUISE DESCENT TO [altitude] | Aircraft is actively flying a Holding pattern<br><br>Also assume that FMS predictions on XYZ waypoint are as:<br>1. Direct TO allowed<br>2. Hold entry allowed<br>3. Altitude constraints insertion NOT allowed<br>4. Steps insertion is allowed<br>5. Time Constraint is allowed | Resume Hold Pattern is allowed: <u>TRUE</u><br>Exit Hold Pattern is allowed: <u>TRUE</u><br>Hold Pattern At PPOS is allowed: FALSE<br>Pending Plan activation allowed: FALSE<br>Undo Direct To is allowed: FALSE<br>Vectors Activation to Final Approach Fix is allowed: FALSE<br>Early Descent is allowed: FALSE<br>Missed Approach Activation is allowed: FALSE<br>Waypoint Operation Availability on <u>XYZ</u> <u>waypoint</u><br>Waypoint addition allowed: FALSE<br>Direct to is allowed: <u>TRUE</u><br>HOLD Entry is allowed: TRUE<br>Altitude Constraint Entry allowed: FALSE<br>Time Constraint Entry allowed: TRUE<br>Step Altitude Entry Allowed: TRUE | 1. ~~ACTIVATE MISSED APPROACH~~<br>2. ~~DESCENT NOW~~<br>3. RESUME HOLD<br>4. EXIT HOLD<br>5. ~~UNDO DIRECT TO~~<br>6. ~~FLY VECTORS TO APPROACH~~<br>7. HOLD AT [position] MAINTAIN [altitude] INBOUND TRACK [direction]<br>8. HOLD AT PPOS INBOUND TRACK [direction]<br>9. ~~AT [position] CLIMB TO [altitude]~~<br>10. AT [position] CRUISE CLIMB TO [altitude]<br>11. ~~AT [position] DESCENT TO [altitude]~~<br>12. AT [position] CRUISE DESCENT TO [altitude] |

FIG. 3B

| A | B | C | D |
|---|---|---|---|
| Filtered Cockpit Vocabulary | Aircraft scenario | Operation Availability Values | Filtered Cockpit Vocabulary |
| 1. ACTIVATE MISSED APPROACH<br>2. DESCENT NOW<br>3. RESUME HOLD<br>4. EXIT HOLD<br>5. UNDO DIRECT TO<br>6. FLY VECTORS TO APPROACH<br>7. HOLD AT PPOS INBOUND TRACK [direction] | "FLY VECTORS TO APPROACH" is valid command if and only if<br>1. Vectors approach is defined<br>2. FAF is not yet sequenced<br>3. Aircraft is within 30NM of destination airport.<br>Assume Aircraft has already sequenced FAF or outside of 30NM radius of destination airport. | Resume Hold Pattern is allowed: FALSE<br>Exit Hold Pattern is allowed: FALSE<br>Hold Pattern At PPOS is allowed: TRUE<br>Pending Plan activation allowed: FALSE<br>Undo Direct To is allowed: FALSE<br>Vectors Activation to Final Approach Fix is allowed: FALSE<br>Early Descent is allowed: FALSE<br>Missed Approach Activation is allowed: FALSE | 1. ~~ACTIVATE MISSED APPROACH~~<br>2. ~~DESCENT NOW~~<br>3. ~~RESUME HOLD~~<br>4. ~~EXIT HOLD~~<br>5. ~~UNDO DIRECT TO~~<br>6. ~~FLY VECTORS TO APPROACH~~<br>7. HOLD AT PPOS INBOUND TRACK [direction] |
| 1. ACTIVATE MISSED APPROACH<br>2. DESCENT NOW<br>3. RESUME HOLD<br>4. EXIT HOLD<br>5. UNDO DIRECT TO<br>6. FLY VECTORS TO APPROACH<br>7. HOLD AT PPOS INBOUND TRACK [direction] | Assume Aircraft is within 30 NM from destination airport and vectors approach is defined | Resume Hold Pattern is allowed: FALSE<br>Exit Hold Pattern is allowed: FALSE<br>Hold Pattern At PPOS is allowed: TRUE<br>Pending Plan activation allowed: FALSE<br>Undo Direct To is allowed: FALSE<br>Vectors Activation to Final Approach Fix is allowed: TRUE<br>Early Descent is allowed: FALSE<br>Missed Approach Activation is allowed: FALSE | 1. ~~ACTIVATE MISSED APPROACH~~<br>2. ~~DESCENT NOW~~<br>3. ~~RESUME HOLD~~<br>4. ~~EXIT HOLD~~<br>5. ~~UNDO DIRECT TO~~<br>6. FLY VECTORS TO APPROACH<br>7. HOLD AT PPOS INBOUND TRACK [direction] |

FIG. 4

| | A | B | C | D |
|---|---|---|---|---|
| | Filtered Cockpit Vocabulary | Aircraft scenario | Operation Availability Values | Filtered Cockpit Vocabulary |
| A | 1. ACTIVATE MISSED APPROACH<br>2. DESCENT NOW<br>3. RESUME HOLD<br>4. EXIT HOLD<br>5. UNDO DIRECT TO<br>6. FLY VECTORS TO APPROACH<br>7. HOLD AT PPOS INBOUND TRACK [direction] | "UNDO DIRECT TO" is a valid command if and only if<br>1. Direct TO is performed<br>2. TO waypoint is NOT yet sequenced or NOT deleted<br>Assume Aircraft has already sequenced the waypoint to which Direct TO operation is done | Resume Hold Pattern is allowed: FALSE<br>Exit Hold Pattern is allowed: FALSE<br>Hold Pattern At PPOS is allowed: TRUE<br>Pending Plan activation allowed: FALSE<br>Undo Direct To is allowed: FALSE<br>Vectors Activation to Final Approach Fix is allowed: FALSE<br>Early Descent is allowed: FALSE<br>Missed Approach Activation is allowed: FALSE | 1. ~~ACTIVATE MISSED APPROACH~~<br>2. ~~DESCENT NOW~~<br>3. ~~RESUME HOLD~~<br>4. ~~EXIT HOLD~~<br>5. ~~UNDO DIRECT TO~~<br>6. ~~FLY VECTORS TO APPROACH~~<br>7. HOLD AT PPOS INBOUND TRACK [direction] |
| B | 1. ACTIVATE MISSED APPROACH<br>2. DESCENT NOW<br>3. RESUME HOLD<br>4. EXIT HOLD<br>5. UNDO DIRECT TO<br>6. FLY VECTORS TO APPROACH<br>7. HOLD AT PPOS INBOUND TRACK [direction] | Assume Aircraft has NOT yet sequenced the waypoint to which Direct TO operation is done | Resume Hold Pattern is allowed: FALSE<br>Exit Hold Pattern is allowed: FALSE<br>Hold Pattern At PPOS is allowed: TRUE<br>Pending Plan activation allowed: FALSE<br>Undo Direct To is allowed: <u>TRUE</u><br>Vectors Activation to Final Approach Fix is allowed: FALSE<br>Early Descent is allowed: FALSE<br>Missed Approach Activation is allowed: FALSE | 1. ~~ACTIVATE MISSED APPROACH~~<br>2. ~~DESCENT NOW~~<br>3. ~~RESUME HOLD~~<br>4. ~~EXIT HOLD~~<br>5. UNDO DIRECT TO<br>6. ~~FLY VECTORS TO APPROACH~~<br>7. HOLD AT PPOS INBOUND TRACK [direction] |

FIG. 5

SYSTEMS AND METHODS FOR UTILIZING VOICE COMMANDS ONBOARD AN AIRCRAFT

TECHNICAL FIELD

The exemplary embodiments described herein generally relate to avionics, and more particularly to systems adapted for utilizing speech recognition and voice commands onboard an aircraft.

BACKGROUND

Modern aircraft include numerous avionics systems and other electronic components or modules. An individual aircraft may include, for example, a navigation system, a communication system, a flight management system, an autopilot system, an autothrust system, an electronic flight bag, and a display system. Historically, in some implementations, each system has its own set of user input devices, such as buttons, switches, keys, knobs, sliders, joysticks, and the like, for receiving input from a pilot, co-pilot, or crew. As result, there may be a considerable number of user input devices within the cockpit of the aircraft. Additionally, each avionics system may be associated with its own display.

To simplify the process of obtaining information from avionics systems, modern aircraft systems consolidate the displays from individual avionics systems to a few central display devices. In addition, to reduce the number of user input devices within the cockpit, some prior art systems also consolidate the functionality of the user input devices for the various avionics systems to a reduced set of input devices, for example, by consolidating functionality of similar input devices across the various avionics systems with an individual input device. This may provide a more consistent user interface and reduce aircraft weight; however, the amount of information and/or functionality associated with a particular display and/or input device increases the complexity of operation. During operation of the aircraft, it is desirable that a pilot, co-pilot or other crew member, be able to quickly and conveniently interact with the avionics systems to operate the avionics systems and/or obtain information needed to ensure safe operation of the aircraft. Some prior art systems attempt to implement speech recognition systems to enable a pilot to quickly and reliably interact with the various avionics systems and cockpit components. However, these systems fail to account for various aspects of the aircraft operation, such as the operating environment, heightened reliability and accuracy requirements, time-sensitive nature of some aircraft operations, and other safety concerns.

Customized vocabulary is often used to narrow the options of correctly recognizing commands. This vocabulary requires pilots to memorize commands which increase workload and doesn't translate to other systems. Using discrete words rather than continuous speech is unnatural to the user and places limits on usability where a continuous string of words such as a radio frequency are better stated all at once rather than in a stilted progression.

Accordingly, it is desirable to provide systems and methods that account for various aspects of the aircraft operation that considers a string of words. Furthermore, other desirable features and characteristics of the exemplary embodiments will become apparent from the subsequent detailed description and the appended claims, taken in conjunction with the accompanying drawings and the foregoing technical field and background.

BRIEF SUMMARY

A system and method are provided for utilizing audio commands associated with an aircraft.

In an exemplary embodiment, a method for utilizing audio commands associated with a vehicle comprises determining the operational state of the vehicle; identifying a movement phase for the vehicle; determining the allowed operations at present position of the vehicle; determining the allowed operations at various waypoints along the intended path of the vehicle; identifying at least one predetermined audio input associated with the movement phase; receiving an audio input; validating the audio input with the current operational state, the allowed operations at the present position, a transportation plan associated with the vehicle, the allowed operations at various points along the transportation plan, the movement phase, and at least one predetermined audio input; and programming a travel management system with the validated audio input.

In another exemplary embodiment, a method for utilizing audio commands associated with an aircraft, the method comprises determining an operational state of the aircraft; identifying a plurality of flight phases; determining the allowed operational states at a plurality of waypoints along the flight plan; identifying a plurality of predetermined audio inputs, wherein each of the flight phases includes at least one of the predetermined audio inputs associated therewith; receiving an audio input; validating the audio input with the current operational state, the allowed operations at the present position, the flight plan, the allowed operations at various points along the flight plan, the flight phase, and the at least one predetermined audio input; and programming a flight management system with the validated audio input.

In yet another exemplary embodiment, a system for utilizing audio commands associated with an aircraft, the system comprises a flight management system configured to determine the operational state of the vehicle; identify a movement phase for the vehicle; determine the allowed operations at present position of the vehicle; determine the allowed operations at various waypoints along the intended path of the vehicle; a speech recognition system configured to identify at least one predetermined audio input associated with the movement phase; an audio input device configured to receive an audio input; and a processor configured to validate the audio input with the current operational state, the allowed operations at the present position, a transportation plan associated with the vehicle, the allowed operations at various points along the transportation plan, the movement phase, and at least one predetermined audio input; and program a travel management system with the validated audio input.

BRIEF DESCRIPTION OF THE DRAWINGS

The present invention will hereinafter be described in conjunction with the following drawing figures, wherein like numerals denote like elements.

FIG. 2 is a chart of flying conditions for a plurality of operational validity categories in accordance with an exemplary embodiment;

FIGS. 3A, 3B, 4, and 5 are charts of the relationship of cockpit vocabulary, aircraft scenario, operation availability values, and filtered cockpit vocabulary in accordance with exemplary embodiments;

DETAILED DESCRIPTION

Figure 1:
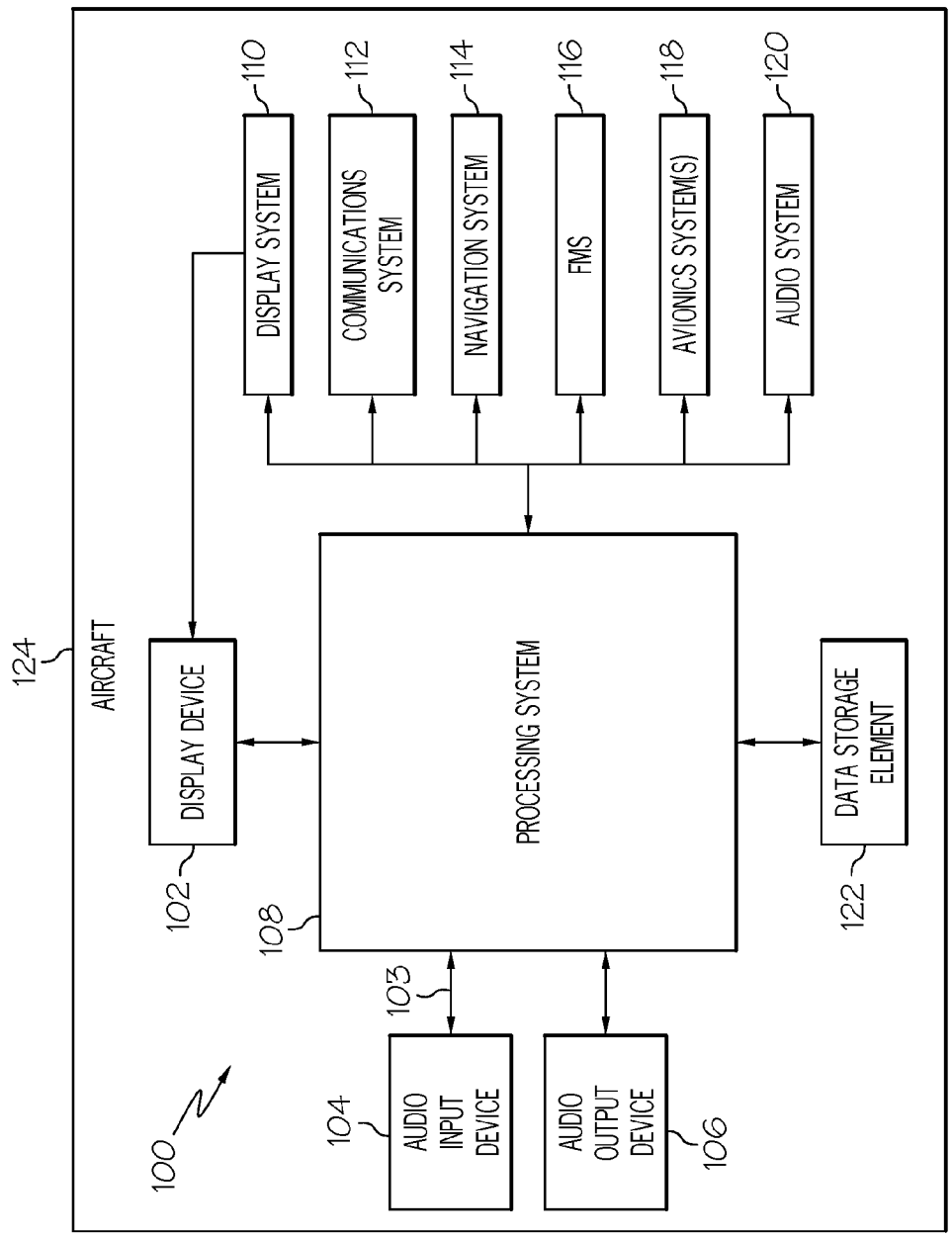
FIG. 1 is a block diagram of a display system suitable for use in an aircraft in accordance with the exemplary embodiments described herein.

The following detailed description is merely illustrative in nature and is not intended to limit the embodiments of the subject matter or the application and uses of such embodiments. Any implementation described herein as exemplary is not necessarily to be construed as preferred or advantageous over other implementations. Furthermore, there is no intention to be bound by any expressed or implied theory presented in the preceding technical field, background, brief summary, or the following detailed description.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word "exemplary" is used exclusively herein to mean "serving as an example, instance, or illustration." Any embodiment described herein as "exemplary" is not necessarily to be construed as preferred or advantageous over other embodiments. Any of the above devices are exemplary, non-limiting examples of a computer readable storage medium.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. Any of the above devices are exemplary, non-limiting examples of a computer readable storage medium In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

For the sake of brevity, conventional techniques related to graphics and image processing, navigation, flight planning, aircraft controls, aircraft data communication systems, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

Technologies and concepts discussed herein relate to systems adapted for receiving, recognizing, validating, and executing voice commands received from a user (e.g., a pilot) operating a vehicle (e.g., an aircraft). An audio input device, such as a microphone, is located onboard the vehicle (e.g., within the cockpit of an aircraft) and adapted to receive audio input indicative of a desired voice command. The received audio input is filtered based on the operating state and/or flight phase of the vehicle, and one or more speech recognition techniques and/or algorithms are preformed to recognized and/or match the filtered audio input as a particular voice command using a limited set of voice commands. As described in greater detail below, filtering, for example, validating, the audio input based on the operating state and/or flight phase and using a limited vocabulary of known commands improves the accuracy and response time of the speech recognition. When audio input is recognized and/or matched to a voice command within the limited set of voice commands, the selected and/or identified voice command is validated based on one or more criterion associated with the voice command before the voice command is provided to the appropriate avionics system for execution. Although the subject matter is described herein in the context of an aircraft, it should be understood that the subject matter may be similarly utilized in other vehicles (e.g., automobiles, marine vessels, trains), and the subject matter described herein is not intended to be limited to an aviation environment. As such, a flight phase would equate to a movement phase, a flight plan would equate to a transportation plan (e.g., route), and a flight management system would equate to a travel management system.

Alternate embodiments of the present invention to those described below may utilize whatever navigation system signals are available, for example a ground based navigational system, a GPS navigation aid, a flight management system, and an inertial navigation system, to dynamically calibrate and determine a precise course.

FIG. 1 depicts an exemplary embodiment of a system 100, which may be located onboard a vehicle such as an aircraft 124. In an exemplary embodiment, the system 100 includes, without limitation, a display device 102, an audio input device 104, an audio output device 106, a processing system 108, a display system 110, a communications system 112, a navigation system 114, a flight (travel) management system (FMS) 116, one or more avionics systems 118, an audio analyzer system 120, and a data storage element 122 suitably configured to support operation of the system 100, as described in greater detail below. It should be understood that FIG. 1 is a simplified representation of a system 100 for purposes of explanation and ease of description, and FIG. 1 is not intended to limit the application or scope of the subject matter in any way. Practical embodiments of the system 100 and/or aircraft 124 will include numerous other devices and components for providing additional functions and features, as will be appreciated in the art. In this regard, although FIG. 1 depicts a single avionics system 118, in practice, the system 100 and/or aircraft 124 will likely include numerous avionics systems for obtaining and/or providing real-time flight-related information that may be displayed on the display device 102 or otherwise provided to a user (e.g., a pilot, a co-pilot, or crew member) via the audio output device 106. A practical embodiment of the system 100 and/or aircraft 124 will likely include one or more of the following avionics systems suitably configured to support operation of the aircraft 124: a weather system, an air traffic management system, a radar system, a traffic avoidance system, an enhanced ground proximity warning system, an autopilot system, an autothrust system, a flight control system, an electronic flight bag and/or another suitable avionics system.

In an exemplary embodiment, the display device 102 is coupled to the display system 110. The display system 110 is coupled to the processing system 108, and the processing system 108 and the display system 110 are cooperatively configured to display, render, or otherwise convey one or more graphical representations or images associated with operation of the aircraft 124 on the display device 102, as described in greater detail below. The processing system 108 is coupled to the navigation system 114 for obtaining real-time navigational data and/or information regarding operation of the aircraft 124 to support operation of the system 100. In an exemplary embodiment, the communications system 112 is coupled to the processing system 108 and configured to support communications to and/or from the aircraft 124, as will be appreciated in the art. The processing system 108 is also coupled to the flight management system 116, which in turn, may also be coupled to the an audio analyzer system 120, navigation system 114, the communications system 112, and one or more additional avionics systems 118 to support navigation, flight planning, and other aircraft control functions in a conventional manner, as well as to provide real-time data and/or information regarding operation of the aircraft 124 to the processing system 108. In an exemplary embodiment, the audio input device 104 is coupled to the processing system 108, and the audio input device 104 and the processing system 108 are cooperatively configured to allow a user to interact with the display device 102 and other elements of system 100 by providing an audio input to the audio input device 104, as described in greater detail below. The audio output device 106 is coupled to the processing system 108, and the audio output device 106 and the processing system 108 are cooperatively configured to provide auditory feedback to a user, as described in greater detail below.

In an exemplary embodiment, the display device 102 is realized as an electronic display configured to graphically display flight information or other data associated with operation of the aircraft 124 (e.g., data from one or more avionics systems 112, 114, 116, 118) under control of the display system 110 and/or processing system 108. In an exemplary embodiment, the display device 102 is onboard the aircraft 124 and located within the cockpit of the aircraft 124. It will be appreciated that although FIG. 1 shows a single display device 102, in practice, additional display devices may be present onboard the aircraft 124. Non-limiting examples of such displays include various cathode ray tube (CRT) displays, and various flat panel displays such as various types of LCD (liquid crystal display) and TFT (thin film transistor) displays. The display device 102 may additionally be implemented as a panel mounted display, a HUD (head-up display) projection, or any one of numerous known technologies. It is additionally noted that the display device 102 may be configured as any one of numerous types of aircraft flight deck displays. For example, it may be configured as a multi-function display, a horizontal situation indicator, or a vertical situation indicator. In the depicted embodiment, however, the display device 102 is configured as a primary flight display (PFD). In an exemplary embodiment, the audio input device 104 and audio output device 106 are also located within the cockpit of the aircraft 124 and adapted to allow a user (e.g., pilot, co-pilot, or crew member) to provide audio input to and receive auditory output from the system 100 and enables a user to interact with the elements of the system 100 in a "hands free" and/or "head up" manner without requiring a user to move his or her hands and/or head to provide and/or receive information, as described in greater detail below. In various embodiments, the audio input device 104 may be realized as a microphone, audio transducer, audio sensor, or another suitable device adapted to receive or otherwise sense audio input from a user. In some embodiments, the audio input device 104 may also include an activation element that comprises a physical feature, such as a button or switch, which may be utilized to enable or otherwise activate the audio input device 104 (e.g., push-to-talk), as will be appreciated in the art and described in greater detail below. In various embodiments, the audio output device 106 may be realized as a speaker, headphone, earphone, ear bud, or another suitable device adapted to provide auditory output to a user. In this regard, in some embodiments, the audio input device 104 and audio output device 106 may be integrated on a single headset, as will be appreciated in the art. It should be appreciated that although FIG. 1 shows the display device 102, the audio input device 104, and the audio output device 106 as being located within the aircraft 124, in practice, one or more of the display device 102, the audio input device 104, and the audio output device 106 may be located outside the aircraft 124 (e.g., on the ground as part of an air traffic control center or another command center) and communicatively coupled to the remaining elements of the system 100 (e.g., via a data link).

In an exemplary embodiment, the navigation system 114 is configured to obtain one or more navigational parameters associated with operation of the aircraft 124. The navigation system 114 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 114, as will be appreciated in the art. In an exemplary embodiment, the communications system 112 is suitably configured to support communications between the aircraft 124 and another aircraft or ground location (e.g., air traffic control). In this regard, the communications system 112 may be realized using a radio communication system or another suitable data link system. In an exemplary embodiment, the flight management system 116 maintains information pertaining to a current flight plan (or alternatively, a current route or travel plan).

In accordance with one or more embodiments, the flight management system 116 (or another avionics system 118) is configured to determine track, speed target, altitude target or otherwise identify the current flight phase of the aircraft 124, as described in greater detail below. As used herein, a flight phase or phase of flight of the aircraft 124 should be understood as a distinguishable segment of the operation (or distinguishable phase) of the aircraft 124 associated with traversing the aircraft 124 from a starting location to an ending location. For example, operation of the aircraft 124 from a starting location (e.g., a terminal at a first airport) to an ending location (e.g., a terminal at a second airport) usually comprises a plurality of flight phases, such as, for example, a preflight phase (e.g., when the aircraft is stationary on the ground, when the flight crew enters the flight route into FMS, towing (e.g., when the aircraft is moving on the ground with assistance), a takeoff phase, a climbing phase (e.g., including the initial climb and/or climb to cruise), a cruising phase, a descent phase (e.g., from cruise altitude to initial approach), an approach phase, a landing phase, go around phase and flight completed phase. In addition to flight phases, there are numerous operational states and lateral and vertical profile segments that the aircraft needs to fly in to execute the planned restrictions and predicted targets along the flight path. These operational states and lateral and vertical profile segments for example include: maneuvers to fly a holding pattern and/or procedure turn within the approach phase preparatory to landing; acceleration and/or deceleration segments to meet the planned and/or predicted speed or time restrictions/targets at various waypoints along the flight path; climb, descend, step climb and step descend to meet altitude restrictions in various phases of aircraft; lateral path restrictions, for example, parallel offset paths avoiding terrain and traffic, fixed radius paths around navaids, follow a specified course, a course to intercept significant waypoints (e.g., final approach fix) paths and other direct to paths. The scope of this invention is not to be limited to any particular number and/or classification of operational states. In addition to the delineated flight phases, lateral and vertical profile segments and operational states, the flight management system 116 may identify other operating states of the aircraft 124, such as, for example, operation with one or more engines disabled, operation when afterburners onboard the aircraft 124 are being utilized, transonic and/or supersonic operation of the aircraft 124.

The display system 110 generally represents the hardware, software, and/or firmware components configured to control the display and/or rendering of one or more navigational maps and/or other displays pertaining to operation of the aircraft 124 and/or avionics systems 112, 114, 116, 118, and the an audio analyzer system 120, on the display device 102. In this regard, the display system 110 may access or include one or more databases suitably configured to support operations of the display system 110, such as, for example, a terrain database, an obstacle database, a navigational database, a geopolitical database, a terminal airspace database, a special use airspace database, or other information for rendering and/or displaying content on the display device 102.

In operation, the display system 110 is also configured to process the current flight status data for the host aircraft. In this regard, the sources of flight status data generate, measure, and/or provide different types of data related to the operational status of the host aircraft, the environment in which the host aircraft is operating, flight parameters, and the like. In practice, the sources of flight status data may be realized using line replaceable units (LRUs), transducers, accelerometers, instruments, sensors, and other well-known devices. The data provided by the sources of flight status data may include, without limitation: airspeed data; groundspeed data; altitude data; attitude data, including pitch data and roll data; yaw data; geographic position data, such as GPS data; time/date information; heading information; weather information; flight path data; track data; radar altitude data; geometric altitude data; wind speed data; wind direction data; etc. The display system 110 is suitably designed to process data obtained from the sources of flight status data in the manner described in more detail herein. In particular, the display system 110 can use the flight status data of the host aircraft when rendering the ITP display.

The processing system 108 generally represents the hardware, software, and/or firmware components configured to facilitate communications and/or interaction between the audio devices 104, 106 and the other elements of the system 100 and perform additional tasks and/or functions described in greater detail below. Depending on the embodiment, the processing system 108 may be implemented or realized with a general purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The processing system 108 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the processing system 108 includes processing logic that may be configured to carry out the functions, techniques, and processing tasks associated with the operation of the system 100, as described in greater detail below. Furthermore, the steps of a method or algorithm described in connection with the embodiments disclosed herein may be embodied directly in hardware, in firmware, in a software module executed by the processing system 108, or in any practical combination thereof. In an exemplary embodiment, the processing system 108 implements a speech recognition engine (or voice recognition engine) and/or speech-to-text system as well as a speech synthesizer and/or text-to-speech system. The processing system 108 may also include one or more analog-to-digital converters (ADCs), digital-to-analog converters (DACs), analog filters and/or digital filters suitably configured to support operations of the system 100, as described in greater detail below. In some embodiments, the features and/or functionality of the processing system 108 may be implemented as part of the flight management system 116, another avionics system 118, or the audio analyzer system 120, as will be appreciated in the art.

The data storage element 122 may be realized as RAM memory, flash memory, EPROM memory, EEPROM memory, registers, a hard disk, a removable disk, a CD-ROM, or any other form of storage medium known in the art. In this regard, the data storage element 122 can be coupled to the processing system 108 such that the processing system 108 can be read information from, and write information to, the data storage element 122. In the alternative, the data storage element 122 may be integral to the processing system 108. As an example, the processing system 108 and the data storage element 122 may reside in an ASIC. In practice, a functional or logical module/component of the system 100 might be realized using program code that is maintained in the data storage element 122. For example, the display system 110 or the communication system 112 may have associated software program components that are stored in the data storage element 122. Moreover, the data storage element 122 can be used to store data utilized to support the operation of the system 100, as will become apparent from the following description.

It should be understood that FIG. 1 is a simplified representation of a display system 100 for purposes of explanation and ease of description, and FIG. 1 is not intended to limit the application or scope of the subject matter in any way. In practice, the display system 100 and/or aircraft 108 will include numerous other devices and components for providing additional functions and features, as will be appreciated in the art.

During the course of this description, like numbers may be used to identify like elements according to the different figures that illustrate the various exemplary embodiments.

To increase recognition accuracy in commanding the FMS 116 without compromising a pilot's natural speech pattern and operational vocabulary, the exemplary embodiments comprise a solution that compares the current operational state of the aircraft (for example, climb, level flight, and descent, aircraft current speed, altitude, and heading), the current scenario being flown, planned and predicted lateral and vertical trajectory of the flight route (flight plan), flight plan and waypoints operation availability values (operation availability indications) as provided by FMS and the requested action being taken, which uses that data to smartly adapt the recognition algorithm's choices. For example, if the speech input were "Hold At flight level 320" and what was recognized was "Told at flight level 320", based on what was operationally feasible at the time, the recognition system could intelligently check itself and substitute HOLD and automatically fix the error. For a phoneme (a basic unit of a language's phonology) based system, an intelligent parser can be employed.

The FMS 116 typically produces operation validity bits (operation availability values/indications) for aircraft present position, flight plan, and waypoints on the flight path (see for example FIG. 2). This data is produced for a display system to control the content of menu selection at any waypoint in the flight plan or associated with the airplane symbol. This data is based upon the flight plan type and flight plan status (pending flight path modifications not yet confirmed), the current aircraft position, current speed, current altitude, and current heading, which leg is being flown, what the next leg is, whether the flight route has any acceleration and deceleration segments, whether a constraint such as a required time of arrival (RTA) and/or altitude is added and a plurality of other parameters are used to compute the validity bits and are output in the map buffer at least once every four seconds or on pilot action. In a unique application, this data can also be used to control the vocabulary selection a speech recognition system has to choose from, thus increasing recognition rates as well as providing a display to the pilot for possible choices and providing confirmation/confidence of his input in lieu of cursor controlled menu.

In accordance with the exemplary embodiments, speech 103 is provided from the audio input device 104 to the audio analyzer system 120. The operational state of the aircraft at the current position and the planned and predicted operational states of the aircraft at various significant waypoints along the flight path is determined by the flight management system 116 and provided to the audio analyzer system 120. Operational states include, for example in a general sense, climb, descent, level flight, current and/or predicted speed, altitude, and heading to meet the planned restrictions and targets.

Flight phases are also determined by the flight management system 116, and include for example, takeoff, climb, cruise, approach, missed approach, and landing, and are provided to the audio analyzer system 120 as flight phase indications. The data storage element 122 stores a plurality of predetermined audio inputs (e.g., one or a plurality of words), each associated with one of a plurality of flight phases and operational states comprising the flight plan. Examples of the predetermined audio inputs include: ACTIVATE MISSED APPROACH, DESCEND NOW, RESUME HOLD, EXIT HOLD, AT xxx CRUISE CLIMB TO XXX, AT xxx CLIMB TO xxx, AT xxx DESCENT TO xxx, DIRECT TO xxx, CROSS xxx AT OR ABOVE xxx, and other general keywords and alphanumeric audio inputs, where xxx is a variable that may change with regard to position of the aircraft. Speech recognition software in the audio analyzer system 120 validates the speech 103 as one of the stored flight phases in view of the operational state, lateral and vertical profile segment, flight phase, and flight plan, and provides the stored predetermined audio inputs as a command to the flight management system 116. The predetermined audio inputs may not be exclusive to a specific flight phase; however, the other filtering like the operational state of the aircraft, the lateral and vertical trajectory of the flight route from origin till destination and various operations that are allowed, as indicated by flight management system, at the present position of aircraft as well as on various significant waypoints along the intended flight path is used.

A more specific example is described with reference to FIGS. 3, 4, and 5 which relates to a holding pattern, fly vectors to approach, and undo (revert) direct to situations, respectively. In each FIGS. 3A, 3B, 4, and 5, column A includes the contents of a cockpit vocabulary, column B includes the aircraft scenario, column C includes operation availability values (availability indications) from the FMS, and column D indicates the filtered vocabulary. Referring now to row A of FIG. 3A, the scenario is that the aircraft is flying a track to a fixed leg and is outside of any planned holding patterns (column B). In this operational state, the FMS 116 outputs operational availability values (availability indications in column C) indicating that resume hold and exit hold operations are not valid operations. The audio system 120 (speech recognition system) uses these FMS provided operation availability values (availability indications) and filters out (column D) RESUME HOLD and EXIT HOLD vocabulary from the cockpit vocabulary. Referring to row B of FIG. 3B, the scenario is the aircraft is actively flying a holding pattern. In this operational state, the FMS 116 outputs operational availability values (availability indications in column C) indicating that resume hold and exit hold operations are valid operations and based on these FMS provided operation availability values (availability indications), the audio system 120 (speech recognition system) retains RESUME HOLD and EXIT HOLD vocabulary in the speech recognition process step. Similarly, referring to row A of FIG. 4, the scenario is that the aircraft has already sequenced final approach fix (FAF) or aircraft is outside of 30 NM radius of destination airport. In this operational state, the FMS 116 outputs operational availability values (availability indications in column C) indicating that approach vectors flying to FAF is NOT allowed. The audio system 120 (speech recognition system) uses these FMS provided operation availability values (availability indications) and filters out (column D) FLY VECTORS TO APPROACH vocabulary from the cockpit vocabulary.

Figure 6:
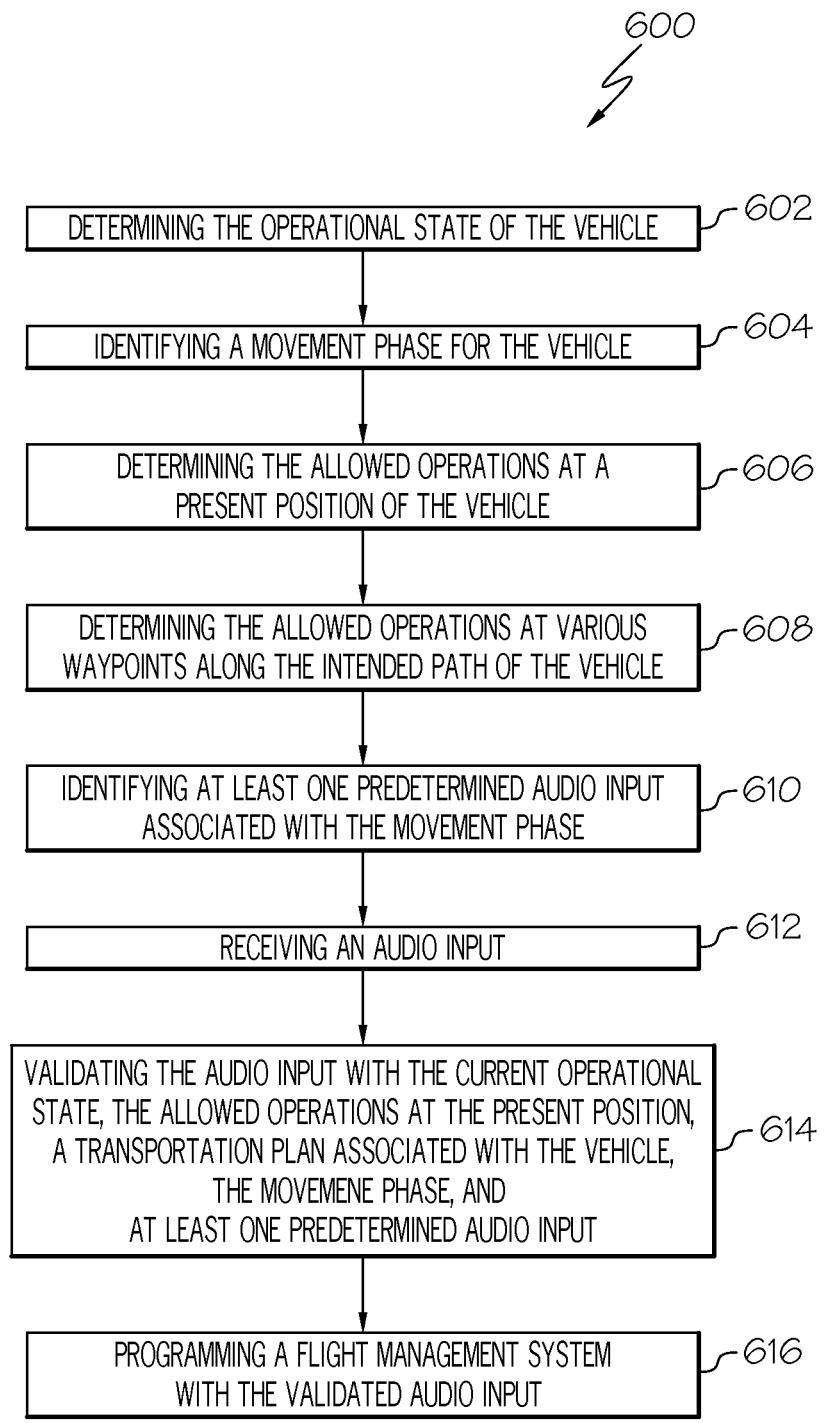
FIG. 6 is a flow diagram of an exemplary voice command recognition process suitable for use with the display system of FIG. 1 in accordance with a first embodiment.
Figure 7:
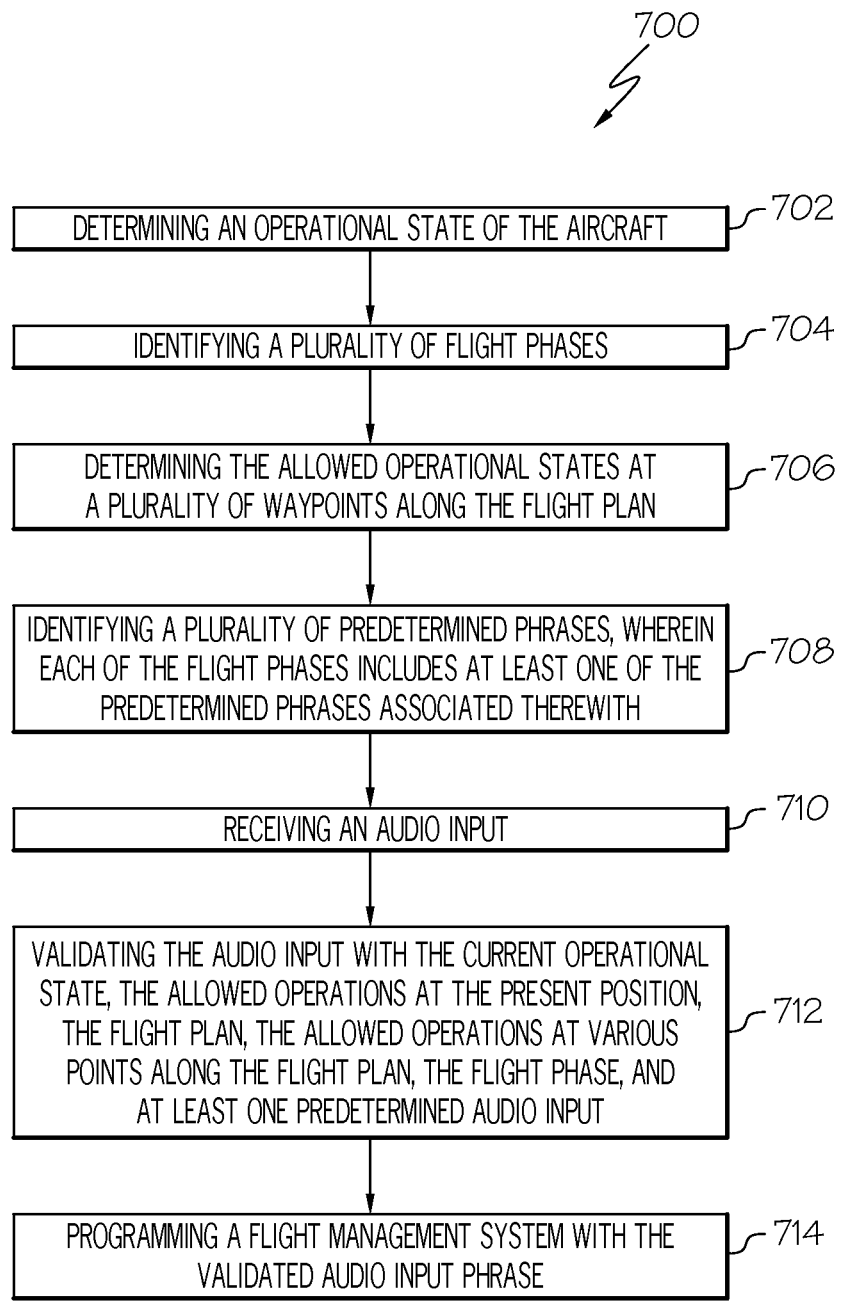
FIG. 7 is a flow diagram of an exemplary voice command recognition process suitable for use with the display system of FIG. 1 in accordance with a first embodiment.

FIGS. 6 and 7 are flow charts that more specifically illustrate exemplary embodiments of methods 600, 700, respectively, suitable for use with a flight deck display system 100. The various tasks performed in connection with methods 600, 700 may be performed by software, hardware, firmware, or any combination thereof. For illustrative purposes, the following description of methods 600, 700 may refer to elements mentioned above in connection with preceding FIG. 1. In practice, portions of methods 600, 700 may be performed by different elements of the described system, e.g., a processor, a display element, or a data communication component. It should be appreciated that methods 600, 700 may include any number of additional or alternative tasks, the tasks shown in FIGS. 6 and 7 need not be performed in the illustrated order, and methods 600, 700 may be incorporated into a more comprehensive procedure or method having additional functionality not described in detail herein. Moreover, one or more of the tasks shown in FIGS. 6 and 7 could be omitted from an embodiment of the methods 600, 700 as long as the intended overall functionality remains intact.

In accordance with FIG. 6, a method for utilizing audio commands associated with a vehicle comprises determining 602 the operational state of the vehicle; identifying 604 a movement phase for the vehicle; determining 606 the allowed operations at present position of the vehicle; determining 608 the allowed operations at various waypoints along the intended path of the vehicle; identifying 610 at least one predetermined audio input associated with the movement phase; receiving 612 an audio input; validating 614 the audio input with the current operational state, the allowed operations at the present position, a transportation plan associated with the vehicle, the allowed operations at various points along the transportation plan, the movement phase, and at least one predetermined audio input; and programming 616 a travel management system with the validated audio input. As used herein, validating means filtering the audio input based on the factors listed.

In accordance with FIG. 7, a method for utilizing audio commands associated with an aircraft comprises determining 702 an operational state of the aircraft; identifying 704 a plurality of flight phases; determining 706 the allowed operational states at a plurality of waypoints along the flight plan; identifying 708 a plurality of predetermined audio inputs, wherein each of the flight phases includes at least one of the predetermined audio inputs associated therewith; receiving 710 an audio input; validating 712 the audio input with the current operational state, the allowed operations at the present position, the flight plan, the allowed operations at various points along the flight plan, the flight phase, and the at least one predetermined audio input; and programming 714 a flight management system with the validated audio input.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. A method for utilizing audio commands associated with a vehicle, the method comprising:
   determining a current operational state of the vehicle;
   determining predicted operational states of the vehicle at one or more waypoints of a travel plan for the vehicle;
   identifying a current movement phase for the vehicle;
   determining first allowed operations at a present position of the vehicle based on the current operational state and the current movement phase;

determining second allowed operations at the one or more waypoints along the travel plan of the vehicle based on the predicted operational states at the one or more waypoints;

outputting, by a travel management system, operation availability indications of the first and second allowed operations to a display system, the operation availability indications of the first allowed operations controlling the content of menu selection associated with a vehicle symbol and the operation availability indications of the second allowed operations controlling the content of menu selection associated with the one or more waypoints along the travel plan;

filtering a cockpit vocabulary to obtain a filtered vocabulary that retains the first allowed operations and the second allowed operations using the operation availability indications to filter out operations that are not valid at the present position of the vehicle based on the current operational state and the current movement phase or the one or more waypoints along the travel plan of the vehicle based on the predicted operational states at the one or more waypoints;

receiving an audio input;

validating the audio input as a predetermined audio input of a plurality of predetermined audio inputs using the filtered vocabulary, wherein one or more predetermined audio inputs of the plurality of predetermined audio inputs comprises a plurality of words; and programming the travel management system with the validated audio input.

2. The method of claim 1 wherein the vehicle comprises an aircraft, the current movement phase comprises a flight phase, the travel plan comprises a flight plan, and the travel management system equates to a flight management system.

3. The method of claim 2 wherein identifying the second allowed operations at the one or more waypoints along the flight plan comprises identifying whether any of altitude restraints, speed restraints, and timing restraints can be defined on the aircraft's arrival at a defined point in the flight plan.

4. The method of claim 2 wherein identifying the first and/or second allowed operations at the present position and/or at the one or more waypoints along the flight plan comprises identifying whether any maneuvers comprising holding patterns, procedure turns, orbit patterns, flyovers; vertical constraints comprising step climbs, step descends and diversions to specified altitudes; and path restrictions comprising parallel offset paths, fixed radius paths associated with a navigation aid, fixed course paths, course intercept paths can be defined at the present position and/or at the one or more waypoints along the flight plan.

5. The method of claim 2 wherein identifying the first allowed operations at the present position of the vehicle comprises identifying whether any of initiating an early descent, diverting to a specified altitude, diverting to a specified waypoint, flying a vector course to final approach fix, and diverting to missed approach, diverting to an alternate airport is allowed at the present position.

6. The method of claim 1, the vehicle comprising an aircraft, the travel plan comprising a flight plan, and the travel management system comprising a flight management system onboard the aircraft, the aircraft including a display device and the display system coupled to the display device and the flight management system to display information associated with operation of the aircraft on the display device, the method further comprising:

using, by the display system, the operation availability indications to control menu selection associated with an airplane symbol on the display device or any of the one or more waypoints along the flight plan on the display device.

7. The method of claim 1, wherein:

the vehicle comprises an aircraft;

the travel plan comprises a flight plan;

the travel management system comprises the flight management system onboard the aircraft;

the aircraft includes a display device and the display system coupled to the display device; and the flight management system displays information associated with operation of the aircraft on the display device.

8. The method of claim 1, wherein the filtered vocabulary comprises the plurality of predetermined audio inputs corresponding to the first and second allowed operations.

9. The method of claim 1, wherein determining second allowed operations at the one or more waypoints along the travel plan of the vehicle comprises the travel management system identifying whether any of an altitude restraint, a speed restraint, and a timing restraint can be defined on the vehicle's arrival at a defined waypoint of the one or more waypoints.

10. A method for utilizing audio commands associated with an aircraft, the method comprising:

determining a current operational state of the aircraft;

determining predicted operational states of the aircraft at one or more waypoints of a flight plan;

identifying a current flight phase for the aircraft;

outputting, by a flight management system onboard the aircraft to a display system onboard the aircraft, operation availability indications of first allowed operations at a present position of the aircraft based on the current operational state and the current flight phase and operation availability indications of second allowed operations at the one or more waypoints along the flight plan based on the predicted operational states at the one or more waypoints, wherein the operation availability indications of the first allowed operations control the content of menu selection associated with an aircraft symbol and the operation availability indications of the second allowed operations controlling the content of menu selection associated with the one or more waypoints along the flight plan;

filter a cockpit vocabulary using the operation availability indications output by the flight management system onboard the aircraft to retain the first allowed operations and the second allowed operations in a filtered cockpit vocabulary and to filter out operations that are not valid at the present position for the current operational state and the current flight phase or at the one or more waypoints along the flight plan, the filtered cockpit vocabulary comprising a plurality of predetermined audio inputs corresponding to the first allowed operations at the present position of the aircraft and the second allowed operations at the one or more waypoints, wherein one or more predetermined audio inputs of the plurality of predetermined audio inputs comprises a plurality of words;

receiving an audio input;

validating the audio input as one of the plurality of predetermined audio inputs corresponding to one of the allowed operations using the filtered cockpit vocabulary; and programming the flight management system with the validated audio input.

11. The method of claim 10 wherein the operational state comprise one of a climb, level flight, or a descent.

12. The method of claim 10 further comprising identifying whether any of altitude restraints, speed restraints, and timing restraints can be defined on the aircraft's arrival at a defined point in the flight plan.

13. The method of claim 10 further comprising identifying whether any maneuvers comprising holding patterns, procedure turns, orbit patterns, flyovers; vertical constraints comprising step climbs, step descends and diversions to specified altitudes; and path restrictions comprising parallel offset paths, fixed radius paths, fixed course paths, course intercept paths can be defined at a present position of the aircraft and/or at various waypoints along the flight plan.

14. The method of claim 10 further comprising: identifying whether any of initiating early descent, diverting to a specified altitude, diverting to a specified waypoint, flying a vector course to a final approach fix, diverting to a missed approach, diverting to an alternate airport is allowed at a present position of the aircraft.

15. A system for utilizing audio commands associated with an aircraft, the system comprising:
a display device onboard the aircraft;
a display system onboard the aircraft and coupled to the display device to display information associated with operation of the aircraft on the display device;
a flight management system coupled to the display system and configured to:
  determine a current operational state of the aircraft;
  identify a current movement phase for the aircraft;
  determine first allowed operations at a present position of the aircraft;
  determine second allowed operations at various waypoints along the intended path of the aircraft; and
  output operation availability indications for the first and second allowed operations to the display system, wherein the operation availability indications for the first allowed operations control the content of menu selection associated with an aircraft symbol on the display device and the operation availability indications for the second allowed operations controlling the content of menu selection associated with one or more of the various waypoints along the intended path;
a speech recognition system configured to:
  filter a cockpit vocabulary using the operation availability indications output by the flight management system to retain the first and second allowed operations based on the operation availability indications and filter out invalid operations at the present position of the aircraft and the various waypoints, resulting in a filtered cockpit vocabulary comprising a plurality of predetermined audio inputs corresponding to the first and second allowed operations, wherein one or more predetermined audio inputs of the plurality of predetermined audio inputs comprises a plurality of words;
an audio input device configured to:
  receive an audio input; and
a processor configured to:
  validate the audio input as one of the plurality of predetermined audio inputs corresponding to an allowed operation of the first and second allowed operations using the filtered cockpit vocabulary; and
  program the flight management system with the validated audio input.

16. The system of claim 15 wherein the current operational state comprises one of a climb, level flight, a descent, a speed, an altitude, and a heading.

17. The system of claim 15 wherein the current movement phase comprises a current phase of the aircraft within a flight plan.

18. The system of claim 15 wherein the flight management system further identifies the second allowed operations at various waypoints along the flight plan including identifying whether any of altitude restraints, speed restraints, and timing restraints can be defined on the aircraft's arrival at a defined point in the flight plan.

19. The system of claim 15 wherein the flight management system is further configured to identify the first allowed operations at the present position of the aircraft including identifying whether any of initiating early descent, diverting to a specified altitude, diverting to a specified waypoint, flying a vector course to a final approach fix, diverting to a missed approach, diverting to an alternate airport is allowed at the present position.

20. The system of claim 15 wherein the audio input device is further configured to recognize a user's natural speech pattern and operational vocabulary of the aircraft.

* * * * *